(12) United States Patent
Govinda Kammath

(10) Patent No.: US 12,663,531 B2
(45) Date of Patent: Jun. 23, 2026

(54) RADAR-BASED TARGET TRACKER

(71) Applicant: Infineon Technologies AG, Neubiberg (DE)

(72) Inventor: Abhilash Govinda Kammath, Munich (DE)

(73) Assignee: Infineon Technologies AG, Neubiberg (DE)

( * ) Notice: Subject to any disclaimer, the term of this patent is extended or adjusted under 35 U.S.C. 154(b) by 203 days.

(21) Appl. No.: 18/481,505

(22) Filed: Oct. 5, 2023

(65) Prior Publication Data

US 2024/0151843 A1     May 9, 2024

Related U.S. Application Data

(60) Provisional application No. 63/423,184, filed on Nov. 7, 2022.

(51) Int. Cl.
| | |
|---|---|
| *G01S 13/536* | (2006.01) |
| *G01S 7/35* | (2006.01) |
| *G01S 13/538* | (2006.01) |
| *G01S 13/58* | (2006.01) |
| *G01S 13/72* | (2006.01) |

(52) U.S. Cl.
CPC ............ *G01S 13/536* (2013.01); *G01S 7/356* (2021.05); *G01S 13/538* (2013.01); *G01S 13/584* (2013.01); *G01S 13/723* (2013.01)

(58) Field of Classification Search
CPC ...... G01S 13/536; G01S 7/356; G01S 13/538; G01S 13/584; G01S 13/723
See application file for complete search history.

(56) References Cited

U.S. PATENT DOCUMENTS

| | | | | |
|---|---|---|---|---|
| 9,229,102 B1 * | 1/2016 | Wright | ................. | G01S 13/885 |
| 2006/0238411 A1 * | 10/2006 | Fullerton | ................ | G01S 13/72 |
| | | | | 342/147 |

(Continued)

FOREIGN PATENT DOCUMENTS

EP          3460507 A1      3/2019

OTHER PUBLICATIONS

Will, Christoph et al., "Human Target Detection, Tracking, and Classification Using 24-Ghz FMCW Radar", IEEE Sensors Journal, vol. 19, No. 17, Sep. 1, 2019, 17 pages.

*Primary Examiner* — William Kelleher
*Assistant Examiner* — Noah Yi Min Zhu
(74) *Attorney, Agent, or Firm* — Slater Matsil, LLP

(57)          ABSTRACT

In accordance with an embodiment, a method includes: for each frame of a plurality of frames over time, obtaining a combined image by combining a plurality of range-Doppler images; for each range and Doppler bin in the combined images, accumulating values each associated to a given frame and indicative of whether a detection has occurred in the corresponding range and Doppler bin in the combined image of the given frame; for each range and Doppler bin in the combined images, determining a moving average based on the values accumulated over time for a corresponding range and Doppler bin; for a current frame, identifying range and Doppler bins in which repeated detection has occurred over past frames based on the moving averages, and generating an updated combined image for the current frame by suppressing the identified range and Doppler bins; and detecting motion in the updated combined image.

20 Claims, 8 Drawing Sheets

(56)          References Cited

U.S. PATENT DOCUMENTS

| | | | | |
|---|---|---|---|---|
| 2019/0094350 A1* | 3/2019 | Baheti | .................... | G01S 7/415 |
| 2019/0227156 A1* | 7/2019 | Santra | .................... | G01S 13/42 |
| 2019/0302252 A1* | 10/2019 | Santra | .................... | G01F 1/663 |
| 2019/0310360 A1* | 10/2019 | Hershkowitz | ........... | G01S 7/356 |
| 2019/0369225 A1* | 12/2019 | Kuo | ........................ | G01S 13/56 |
| 2020/0116850 A1* | 4/2020 | Santra | ................. | A61B 5/0507 |
| 2020/0326422 A1* | 10/2020 | Sagi | ................... | G01S 13/9047 |
| 2020/0363501 A1* | 11/2020 | Lau | ....................... | G01S 15/931 |
| 2021/0072345 A1* | 3/2021 | Menaker | ............... | G01S 7/2927 |
| 2021/0080557 A1* | 3/2021 | Vaishnav | ............... | G01S 13/72 |
| 2021/0190902 A1* | 6/2021 | Amihood | ............... | G01S 7/358 |
| 2021/0215789 A1* | 7/2021 | Hu | .......................... | G01S 7/415 |
| 2022/0065991 A1* | 3/2022 | Zhang | ................... | G01S 13/931 |
| 2022/0120890 A1* | 4/2022 | Roger | .................... | G01S 7/356 |
| 2023/0161027 A1* | 5/2023 | Amihood | ............... | G01S 7/023 |
| | | | | 342/109 |
| 2024/0045052 A1* | 2/2024 | Traa | ........................ | G01S 13/93 |
| 2024/0385282 A1* | 11/2024 | Stefanatos | ............ | G01S 13/931 |

* cited by examiner

RADAR-BASED TARGET TRACKER

This application claims the benefit of U.S. Provisional Application No. 63/423,184, filed on Nov. 7, 2022, which application is hereby incorporated herein by reference.

TECHNICAL FIELD

The present disclosure relates generally to an electronic system and method, and, in particular embodiments, to a radar-based target tracker.

BACKGROUND

Applications in the millimeter-wave frequency regime have gained significant interest in the past few years due to the rapid advancement in low cost semiconductor technologies, such as silicon germanium (SiGe) and fine geometry complementary metal-oxide semiconductor (CMOS) processes. Availability of high-speed bipolar and metal-oxide semiconductor (MOS) transistors has led to a growing demand for integrated circuits for millimeter-wave applications. Such applications include, for example, radar systems for automotive and internet of things (IoT) systems.

In some radar systems, the distance between the radar and a target is determined by transmitting a frequency modulated signal, receiving a reflection of the frequency modulated signal (also referred to as the echo), and determining a distance based on a time delay and/or frequency difference between the transmission and reception of the frequency modulated signal. Accordingly, some radar systems include a transmitting antenna for transmitting the radio-frequency (RF) signal, and a receiving antenna for receiving the reflected RF signal, as well as the associated RF circuits used to generate the transmitted signal and to receive the RF signal.

SUMMARY

In accordance with an embodiment, a method includes: for each frame of a plurality of frames over time, obtaining a combined image by combining a plurality of range-Doppler images each corresponding to a respective receive antenna of a millimeter-wave radar system; for each range and Doppler bin in the combined images for the frames over time, accumulating values each associated to a given frame and indicative of whether or not a detection has occurred in the corresponding range and Doppler bin in the combined image of the given frame; for each range and Doppler bin in the combined images, determining a moving average based on the values accumulated over time for a corresponding range and Doppler bin; for a current frame, identifying range and Doppler bins in which repeated detection has occurred over past frames based on the moving averages, and generating an updated combined image for the current frame by suppressing the identified range and Doppler bins; and detecting motion in the updated combined image.

In accordance with another embodiment, a system includes: a radar signal processor configured to be coupled to a millimeter-wave radar sensor, the radar signal processor configured to: receive a radar signal from a radar sensor; generate a sequence of range-Doppler images based on the received radar signal; determine whether motion is detected on a per-bin basis for the sequence of range-Doppler images; sum a number of determined motion detections on a per-bin basis for a first number of range-Doppler images of the sequence of range-Doppler images to produce summed motion detections; determine per-bin moving averages for the summed motion detections; compare each per-bin moving average of the per-bin moving averages to a threshold; suppress bins in a range-Doppler image of the sequence of range-Doppler images to produce a modified range-Doppler image, the suppressed bins corresponding to bins in the range-Doppler image whose moving average exceeds the threshold; and detect motion based on the modified range-Doppler image.

In accordance with a further embodiment, a system includes: a radar signal processor configured to be coupled to a millimeter-wave radar sensor, the radar signal processor configured to: receive a radar signal from a radar sensor; generate a sequence of range-Doppler images based on the received radar signal; determine whether motion is detected on a per-bin basis for the sequence of range-Doppler images; sum a number of determined motion detections on a per-bin basis for a first number of range-Doppler images of the sequence of range-Doppler images to produce summed motion detections; determine per-bin moving averages for the summed motion detections; compare each per-bin moving average of the per-bin moving averages to a threshold; suppress bins in a range-Doppler image of the sequence of range-Doppler images to produce a modified range-Doppler image, the suppressed bins corresponding to bins in the range-Doppler image whose moving average exceeds the threshold; and detect motion based on the modified range-Doppler image.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in different figures generally refer to corresponding parts unless otherwise indicated. The figures are drawn to clearly illustrate the relevant aspects of the preferred embodiments and are not necessarily drawn to scale.

DETAILED DESCRIPTION OF ILLUSTRATIVE EMBODIMENTS

The making and using of the embodiments disclosed are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The description below illustrates the various specific details to provide an in-depth understanding of several example embodiments according to the description. The embodiments may be obtained without one or more of the specific details, or with other methods, components, materials and the like. In other cases, known structures, materials or operations are not shown or described in detail so as not to obscure the different aspects of the embodiments. References to "an embodiment" in this description indicate that a particular configuration, structure or feature described in relation to the embodiment is included in at least one embodiment. Consequently, phrases such as "in one embodiment" that may appear at different points of the present description do not necessarily refer exactly to the same embodiment. Furthermore, specific formations, structures or features may be combined in any appropriate manner in one or more embodiments.

Embodiments of the present invention will be described in specific contexts, e.g., a radar-based target tracker, which may be used in applications such as human detection. Human detection is a desirable feature on smart devices such as televisions, speakers, lighting systems, security systems, and the like, to provide features such as audio beamforming, brightness control, energy savings, intruder detection, and the like. Some embodiments may be used in other applications.

Figure 1:
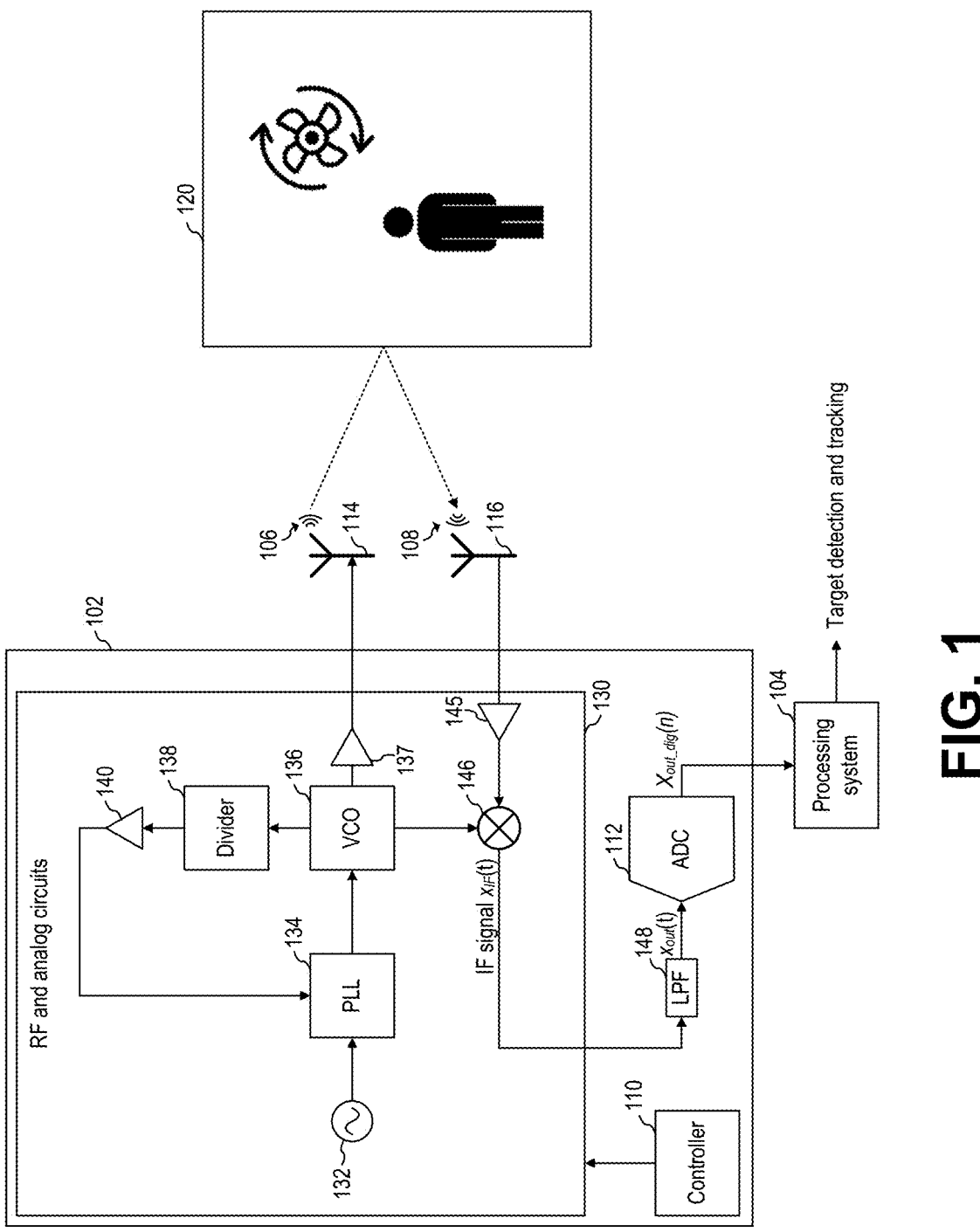
FIG. 1 shows a schematic diagram of a millimeter-wave radar system, according to some embodiments.

FIG. 1 shows a schematic diagram of millimeter-wave radar system 100, according to some embodiments. Millimeter-wave radar system 100 includes millimeter-wave radar sensor 102 and processing system 104, which is also referred to as a radar signal processor.

During normal operation, millimeter-wave radar sensor 102 operates as a frequency-modulated continuous-wave (FMCW) radar sensor and transmits a plurality of TX radar signals 106, such as chirps, towards scene 120 using one or more transmitter (TX) antennas 114. The radar signals 106 are generated using RF and analog circuits 130. The radar signals 106 may be, e.g., in the 20 GHz to 120 GHz range. Other frequencies may also be used. For example, human moving targets may be detected using radar signals 106 in the range of 24 GHz to 60 GHz.

The objects in scene 120 may include one or more static or moving objects, such as tables, walls, chairs, etc., idle and moving humans and animals, as well as periodically-moving objects, such as rotating fans, curtains, cleaning robots, and the like. Other objects may also be present in scene 120. The presence of periodically-moving objects in scene 120 may cause false positives when attempting to detect moving humans and animals in scene 120. As subsequently described in greater detail, moving target indicator (MTI) filtering may be utilized for target detection in scene 120, and a moving average filter may be utilized to filter out false targets (e.g., periodically-moving objects).

The radar signals 106 are reflected by objects in scene 120. The reflected radar signals 108, which are also referred to as echo signals, are received by a plurality of receiving (RX) antennas 116. RF and analog circuits 130 processes the received reflected radar signals 108 using, e.g., band-pass filters (BPFs), low-pass filters (LPFs), mixers, low-noise amplifier (LNA), and/or intermediate frequency (IF) amplifiers to generate an analog signal $x_{out}(t)$ per receiving antenna 116.

The analog signals $x_{out}(t)$ are converted to raw digital data $x_{out\_dig}(n)$ using analog-to-digital converter (ADC) 112. In some embodiments, the raw digital data $x_{out\_dig}(n)$ is processed by processing system 104 to detect one or more targets and their position and to track such targets.

Controller 110 controls one or more circuits of millimeter-wave radar sensor 102, such as RF and analog circuit 130 and/or ADC 112. Controller 110 may be implemented, for example, as a custom digital or mixed signal circuit. Controller 110 may also be implemented in other ways, such as using a general-purpose processor or controller, for example. In some embodiments, processing system 104 implements a portion or all of controller 110.

Processing system 104 may be implemented with a general-purpose processor, controller or digital signal processor (DSP) that includes, for example, combinatorial circuits coupled to a memory. In some embodiments, processing system 104 may be implemented as an application specific integrated circuit (ASIC). In some embodiments, processing system 104 may be implemented with an ARM, RISC, or x86 architecture, for example. In some embodiments, processing system 104 may include an artificial intelligence (AI) accelerator. Some embodiments may use a combination of hardware accelerator and software running on a DSP or general-purpose microcontroller. Other implementations are also possible.

In some embodiments, millimeter-wave radar sensor 102 and a portion or all of processing system 104 may be implemented inside the same integrated circuit (IC). For example, in some embodiments, millimeter-wave radar sensor 102 and a portion or all of processing system 104 may be implemented in respective semiconductor substrates that are integrated in the same package. In other embodiments, millimeter-wave radar sensor 102 and a portion or all of processing system 104 may be implemented in the same monolithic semiconductor substrate. In some embodiments, millimeter-wave radar sensor 102 and processing system 104 are implemented in respective integrated circuits. In some embodiments, a plurality of integrated circuits is used to implement millimeter-wave radar sensor 102. In some embodiments, a plurality of integrated circuits is used to implement processing system 104. Other implementations are also possible.

As a non-limiting example, RF and analog circuits 130 may be implemented, e.g., as shown in FIG. 1. During normal operation, voltage-controlled oscillator (VCO) 136 generates radar signals, such as linear frequency chirps (e.g., from 61.02 GHz to 61.47 GHz), which are transmitted by transmitting antenna 114. The VCO 136 is controlled by PLL 134, which receives a reference clock signal from reference oscillator 132. PLL 134 is controlled by a loop that includes frequency divider 138 and amplifier 140. Amplifier 137 may be used to drive transmitting antenna 114.

The TX radar signals 106 transmitted by transmitting antenna 114 are reflected by objects in scene 120 and received by receiving antennas 116. The echo received by receiving antennas 116 are mixed with a replica of the signal transmitted by transmitting antenna 114 using respective mixers 146 to produce respective intermediate frequency (IF) signals $x_{IF}(t)$ (also known as beat signals). In some embodiments, the beat signals $x_{IF}(t)$ have a bandwidth between 10 kHz and 1 MHz. Beat signals with a bandwidth lower than 10 kHz or higher than 1 MHz is also possible. Respective amplifiers 145 may be used to receive the reflected radar signals from antennas 116.

Beat signals $x_{IF}(t)$ may be respectively filtered with respective low-pass filters (LPFs) 148 and then sampled by ADC 112. ADC 112 is advantageously capable of sampling the filtered beat signals $x_{out}(t)$ with a sampling frequency that is smaller than the frequency of the signal received by receiving antennas 116. Using FMCW radars, therefore, advantageously allows for a compact and low-cost implementation of ADC 112, in some embodiments.

The raw digital data $x_{out\_dig}(n)$, which in some embodiments include the digitized version of the filtered beat signals $x_{out}(t)$, is (e.g., temporarily) stored, e.g., in matrices of $N_c \times N_s$ per receiving antenna 116, where $N_c$ is the number of chirps considered in a frame and $N_s$ is the number of transmit samples per chirp, for further processing by processing system 104.

In some embodiments, ADC 112 is a 12-bit ADC with multiple inputs. ADCs with higher resolution, such as 14-bits or higher, or with lower resolution, such as 10-bits, or lower, may also be used. In some embodiments, an ADC per receiver antenna may be used. Other implementations are also possible.

Figure 2:
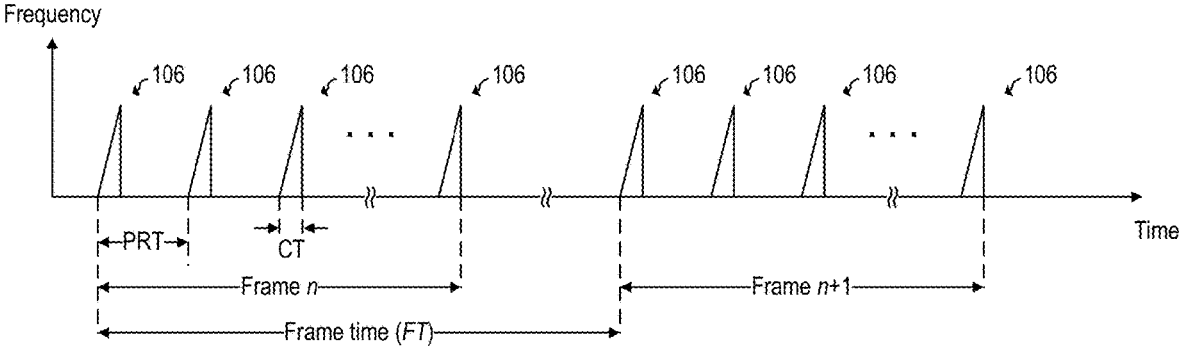
FIG. 2 illustrates a sequence of chirps transmitted by the TX antenna of FIG. 1, according to some embodiments.

FIG. 2 illustrates a sequence of chirps 106 transmitted by TX antenna 114, according to some embodiments. As shown by FIG. 2, chirps 106 are organized in a plurality of frames (also referred to as physical frames) and may be implemented as up-chirps. Some embodiments may use down-chirps or a combination of up-chirps and down-chirps, such as up-down chirps and down-up chirps. Other waveform shapes may also be used.

As shown in FIG. 2, each frame may include a plurality of chirps 106 (also referred to, generally, as pulses). For example, in some embodiments, the number of chirps in a frame is 17. Some embodiments may include more or less than 17 chirps per frame.

In some embodiments, frames are repeated every FT time. In some embodiments, FT time is 100 ms. A different FT time may also be used. The time between chirps of a frame is generally referred to as pulse repetition time (PRT). In some embodiments, the PRT is 1 ms. A different PRT may also be used. In some embodiments, the FT time is selected such that the time between the beginning of the last chirp of frame n and the beginning of the first chirp of frame n+1 is equal to PRT. Other embodiments may use or result in a different timing. The duration of the chirp (from start to finish) is generally referred to as chirp time (CT). The duration between chirps may be in the range of 500 μs to 10 ms, which may be advantageous for detecting the movement of humans. In some embodiments, the sampling frequency of millimeter-wave radar sensor 102 may be, e.g., 1 MHz. Higher sampling frequencies or lower sampling frequencies may also be possible. In some embodiments, the number of samples used to generate each chirp may be, e.g., 128 samples. A higher number of samples or a lower number of samples, such as 64 samples or lower, may also be used to generate each chirp.

Figure 3A:
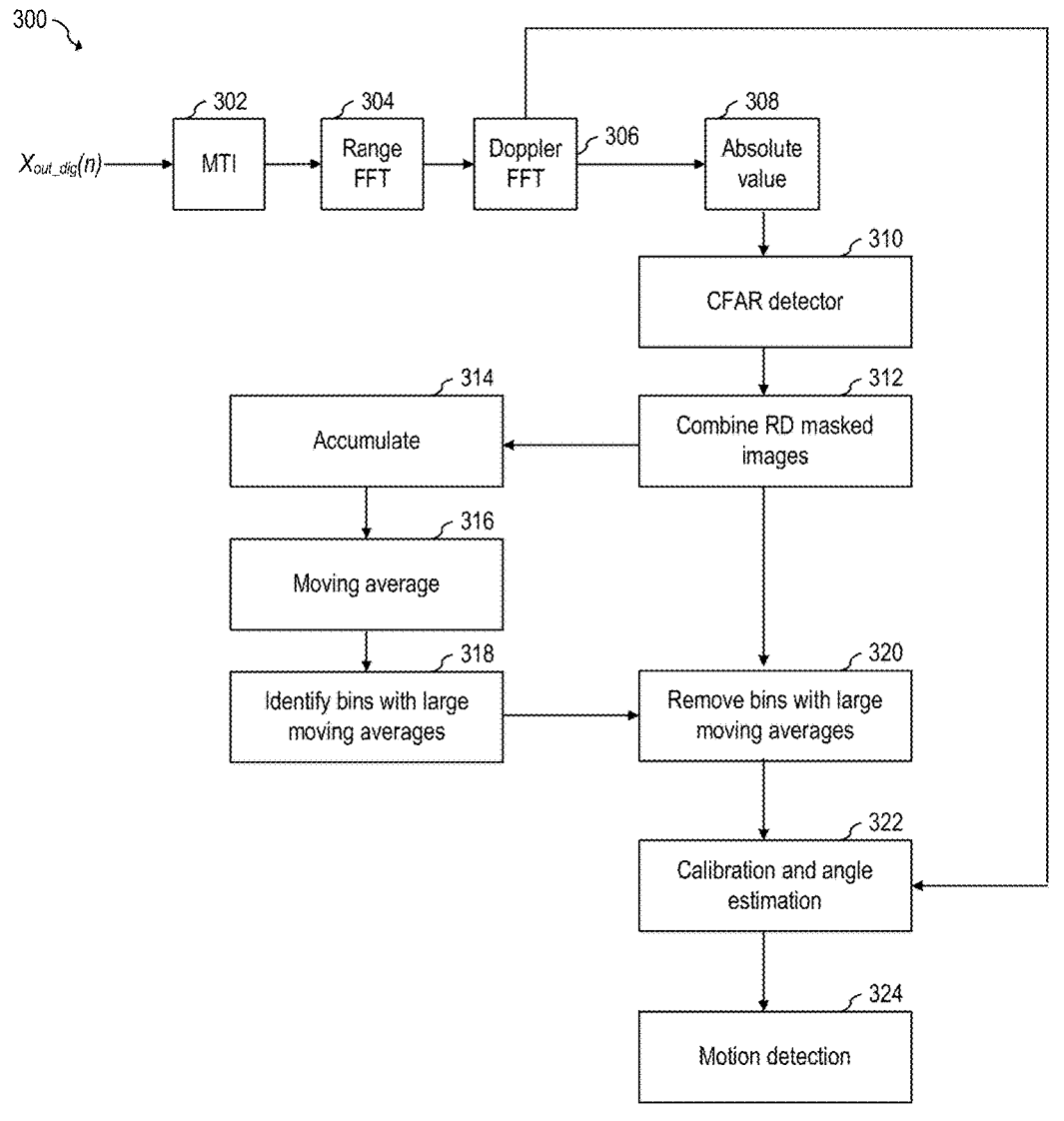
FIGS. 3A and 3B show flow charts of methods for detecting and tracking targets, according to some embodiments.

FIG. 3A shows a flow chart of a method 300 for detecting and tracking targets, according to some embodiments. Method 300 may be implemented by processing system 104.

During step 302, two-dimensional moving target indicator (MTI) filtering is applied to the raw digital data $x_{out\_dig}(n)$ (e.g., on data from each receiving channel, e.g., from each receiving antenna 116) to generate first filtered images. In some embodiments, performing MTI filtering serves to discriminate a target against the clutter. For example, in some embodiments, after MTI filtering is performed on the digital data, only targets with high motion are retained as their energy varies across Doppler images. Thus, in some embodiments, after 2D MTI filtering, a target may be identifiable in the digital data while information about the background may be partially or fully removed from the digital data. In some embodiments, the 2D MTI filter is implemented as a first order finite impulse response (FIR) filter.

MTI filtering may be applied in the time domain or in the frequency domain. In the time domain, MTI filtering is performed by taking the delta between the chirps and then performing fast time Fourier transforms (FFTs) and a slow time FFT. In the frequency domain, MTI filtering is performed after applying a fast time FFT and then calculating the delta between slow time samples per fast time bin before performing a slow time FFT. In this context, fast time FFTs are performed on samples in a chirp, and a slow time FFT is performed on samples along multiple chirps.

During step 304, a range FFT is performed on the moving target indicator data generated during step 302. For example, in some embodiments, a windowed FIT having a length of a chirp (e.g., radar signal 106, see FIG. 1) is calculated for each of a predetermined number of chirps (e.g., all chirps) in a frame. The result of the range FFT is an indication of energy distribution across ranges for each chirp.

During step 306, a doppler FFT is performed on the range FFT data (e.g., for each receiving antenna 116) generated during step 304. For example, in some embodiments, an FFT is calculated across each range bin over a number of consecutive periods to extract Doppler information. The result of step 306 are range Doppler maps (also known are range-Doppler images or RDIs) for each of the receiving channels (e.g., for each receiving antenna 116).

Optionally, during step 308, absolute values are determined for the RDIs generated during step 306.

During step 310, target detection is performed using a constant false alarm rate (CFAR) algorithm, such as ordered-statistic (OS) CFAR (OS-CFAR) or cell-averaging CFAR on the absolute values of the RDIs (generated during step 308) or the RDIs (generated during step 306) to generate second filtered images (also referred to as range-Doppler (RD) masked images) for each receiving channel. During step 310, the CFAR detector generates a detection image in which, e.g., "ones" represent targets and "zeros" represent non-targets based on the power levels of the RDI when compared with a, e.g., predetermined threshold. The RD detection image operates as a mask and is multiplied by the original RDI (output of step 308) to obtain an RD masked image (at the output of step 310) in which only details of the detected targets are non-zero. For example, a bitwise AND may be performed with an RD detection image and the original RDI to obtain an RD masked image. A local maxima detector may be applied after the CFAR detector to help with target detection.

Utilizing MTI filtering may be advantageous over other types of target filtering, such as vital sensing or machine learning. For example, MTI filtering may use less memory and processing power than vital sensing and machine learning. As a result, MTI filtering may be advantageous for some types of platforms, such as embedded platforms. However, MTI filtering, on its own, may be more susceptible to detecting false targets (e.g., periodically moving objects) than vital sensing and machine learning. As subsequently described in greater detail, a moving average filter may be utilized to filter false targets (e.g., periodically moving objects) from the RD masked images generated during step 310. This helps provide more reliable detection of some types of targets (e.g., human/animal movements) while ignoring non-targets (e.g., clutter, such as fans, curtains, cleaning robots, etc.).

During step 312, the RD masked images generated during step 310 are combined to obtain combined RD images. For example, the combined RD images may be obtained by performing a bitwise OR with the RD masked images. The combined RD images are unions of the data from the RD masked images for each receiving channel. Each combined RD image is for a frame, with multiple frames being arranged over time.

During step 314, the values of each range and Doppler bin in the combined RD images (generated during step 312) are accumulated. Each value for a bin is a value (e.g., a logical value) indicting whether or not there is a detection in that bin. The accumulated value for each bin indicates how many times motion was detected in that bin over multiple frames. Undesirable non-targets such as the movements of fans and cleaning robots are likely to fall within certain bins, e.g., certain range and Doppler bins. Thus, the accumulated values of certain range and Doppler bins will be greater than the accumulated values on other bins. In other words, a number of determined motion detections are summed on a per-bin basis for a first number of range-Doppler images of a sequence of range-Doppler images to produce summed motion detections.

During step 316, moving averages of the values accumulated during step 314 are calculated. In some embodiments, these moving averages are calculated on a per-bin basis for each bin of the combined RD images. Undesirable non-targets such as the movements of fans and cleaning robots may repeatedly fall within certain range and Doppler bins. When the moving averages of certain range and Doppler bins are large, there is a high probability that undesirable non-targets are indicated by those bins.

During step 318, the range and Doppler bins having large moving averages are identified. The moving average of each bin may be compared to a detection threshold. The subset of the bins having moving averages crossing the detection threshold are identified as having large moving averages. A clutter mask may be generated, in which, e.g., "ones" represent targets and "zeros" represent non-targets based on the moving averages of the values when compared with a, e.g., predetermined threshold.

During step 320, the range and Doppler bins having large moving averages are removed (e.g. suppressed) from the combined RD images (generated during step 312) to generate third filtered images (also referred to as filtered RD images, modified RD images, or updated combined RD images). The clutter mask generated during step 318 may be multiplied by the combined RD images (output of step 312). For example, a bitwise AND may be performed with a combined RD image and the clutter mask. The resulting filtered RD images are thus less likely to contain undesirable non-targets. In some embodiments, a combined RD image for a current frame is filtered with a clutter mask generated from previous frames. In some embodiments, the removal of range and Doppler bins can be viewed as suppressing bins corresponding to bins in a range and Doppler image of a sequence of range and Doppler images having values that exceed the threshold based on a comparison performed in step 318.

Optionally, during step 322, calibration and angle estimation may be applied to the filtered RD images generated during step 320, using the RDIs generated during step 306. Finally, during step 324, motion detection may be performed with the filtered RD images, thereby tracking a target. As a result, only targets at a desired angle and with a desired motion may be tracked.

In one example embodiment, steps 314, 316 and 320 utilize an array having an array of P by Q, wherein P is the number of Doppler bins and Q is the number of range bins. In steps 314 and 316, detections from each frame are summed up for each range and Doppler bin over time and stored in the array. In some embodiments, the values of the array are normalized based on a frame counter. After the values of the array have been normalized, the values are compared to a set threshold to generate a logical output for each range and Doppler bin in step 318. Bins having a value greater than the threshold are masked by setting the bin to logical "FALSE" value in step 320. This logical "FALSE"

value may be designated by setting a corresponding bit or variable to a "0" value. Alternatively, the set value representing the "FALSE" logic condition may be another value besides "0" depending on the particular embodiment and is specifications.

Embodiments may achieve advantages. Utilizing a moving average filter to remove bins having large moving averages from the RD images may help provide more reliable detection of some types of targets (e.g., human/ animal movements) while ignoring non-targets (e.g., clutter, such as fans, curtains, cleaning robots, etc.). Additionally, utilizing a moving average filter with MTI filtering may use less memory and processing power than vital sensing and machine learning. A moving average filter may be readily implemented in an embedded platform without excessive power consumption. For example, the method 300 may be implemented by processing system 104 using as little as 32 KB to 64 KB of memory.

Figure 3B:
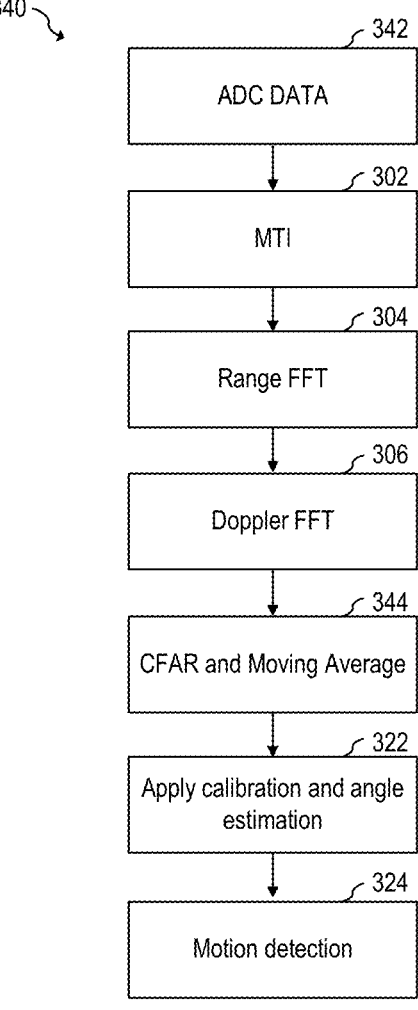

FIG. 3B illustrates a flow chart of a method 340 for detecting and tracking targets, according to some embodiments, which may be implemented by processing system 104.

As shown method 340 starts with step 342 in which ADC data is generated using a ADC to digitize an analog radar sensor signal produced by a radar sensor. In the context of millimeter-wave sensor system 100 shown in FIG. 1, step 342 may be performed using ADC 112 to convert intermediate frequency signal $x_{IF}(t)$ to the digital domain for processing by processing system 104. Next, the ADC data generated during step 342 is processed by performing optional MTI filtering in step 302, a range FFT in step 304 and a Doppler FFT in step 306 as described above with respect to method 300 in FIG. 3A.

Step 344 includes performing a CFAR algorithm on the range-Doppler image generated by the Doppler FFT in step 306, and performing a moving average on the detection image generated by the CFAR algorithm. The output of the moving average calculation may be compared to a threshold on a per-bin basis. Bins in the range-Doppler image corresponding to bin whose moving averages exceed the threshold may suppressed, for example, by setting the respective bin values to zero. In some embodiments, step 344 may be performed by implementing steps 310, 312, 314, 316, 318 and 320 described above with respect to FIG. 3A. In various embodiments, step 344 advantageously filter false targets such as periodically-moving objects.

Calibration and angle estimation may be optionally applied in step 322 and motion is detected in step 324 as described with respect to the description of steps 322 and 324 in the description of FIG. 3A.

It should be understood that the various method steps depicted in FIGS. 3A and 3B may be performed simultaneously and/or in a pipelined fashion.

FIGS. 4A-4D illustrate four performance comparison scenarios that compare the performance of embodiment radar systems and methods that use moving averaged CFAR detection disclosed herein with respect to radar systems that do not use these embodiment techniques.

Figure 4A:
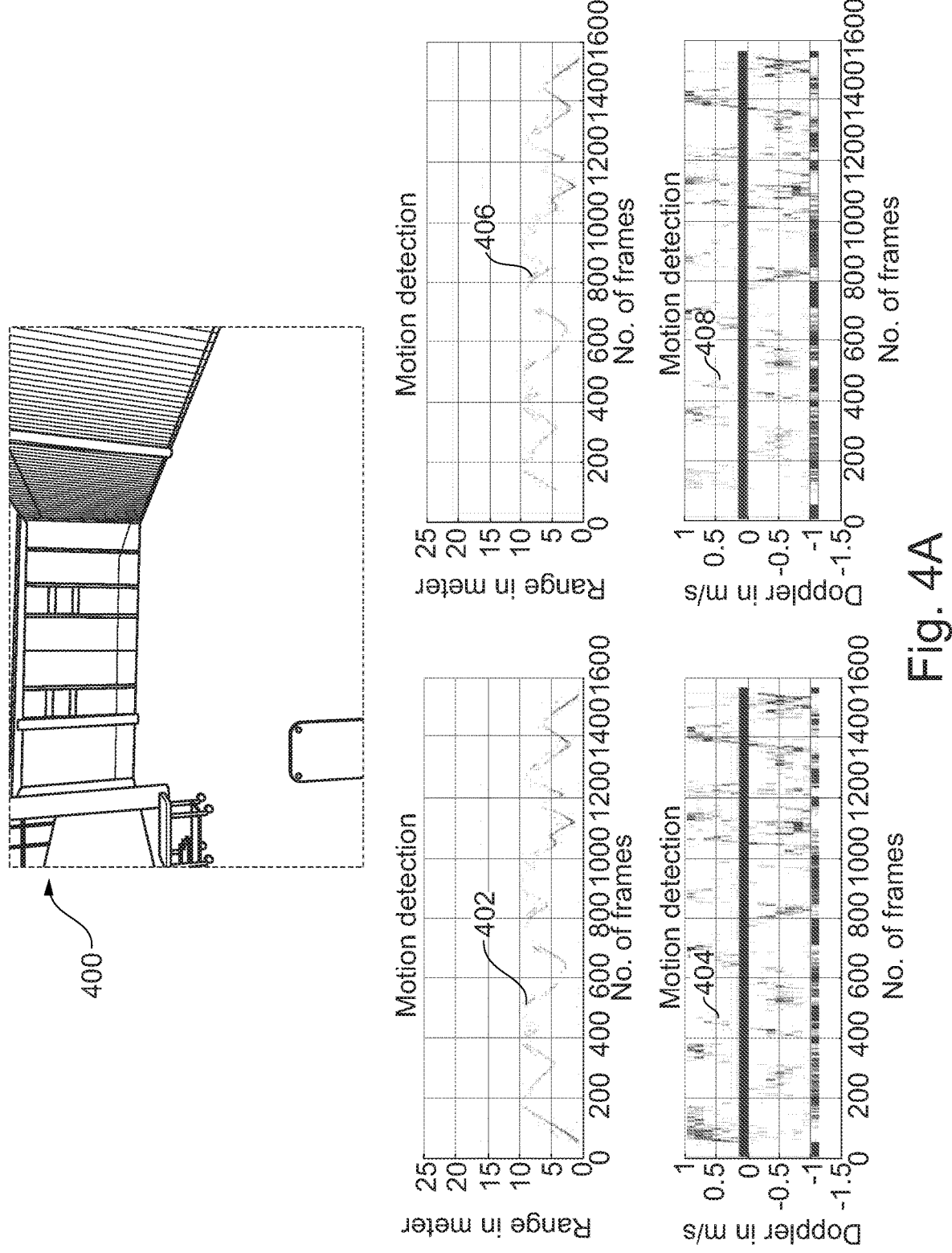
FIGS. 4A, 4B, 4C and 4D illustrate experimental results of target detection.

FIG. 4A illustrates a comparison scenario in which a person walks randomly around the room depicted in diagram 400. Traces 402 and 404 in the bottom-left portion of FIG. 4A depict experimental results for target detection performed without using embodiment moving averaged CFAR detection techniques, while traces 406 and 408 on the bottom-right portion of FIG. 4A depict experimental results for target detection performed using embodiment moving averaged CFAR detection techniques. More specifically, trace 402 shows the range of the detected target in meters and trace 404 shows the velocity of the detected target in meters per second as detected by the system that does not use embodiment moving averaged CFAR detection techniques. As shown the detected range varies from 0 meters during the first few frames and about 10 meters around frame 200. The corresponding detected velocity ranges from 1 meter per second as the target moves away from the radar sensor in frames 50 to 100, to −1 meter per second as the target moves toward the radar sensor in frames 100 to 300.

Trace 406 shows the range of the detected target in meters and trace 408 shows the velocity of the detected target in meters per second as detected by the system that uses embodiment moving averaged CFAR detection techniques. As shown, traces 406 and 408 show very similar behavior as traces 402 and 404, which demonstrates that embodiment moving average techniques do not negatively impact target detection in this case.

Figure 4B:
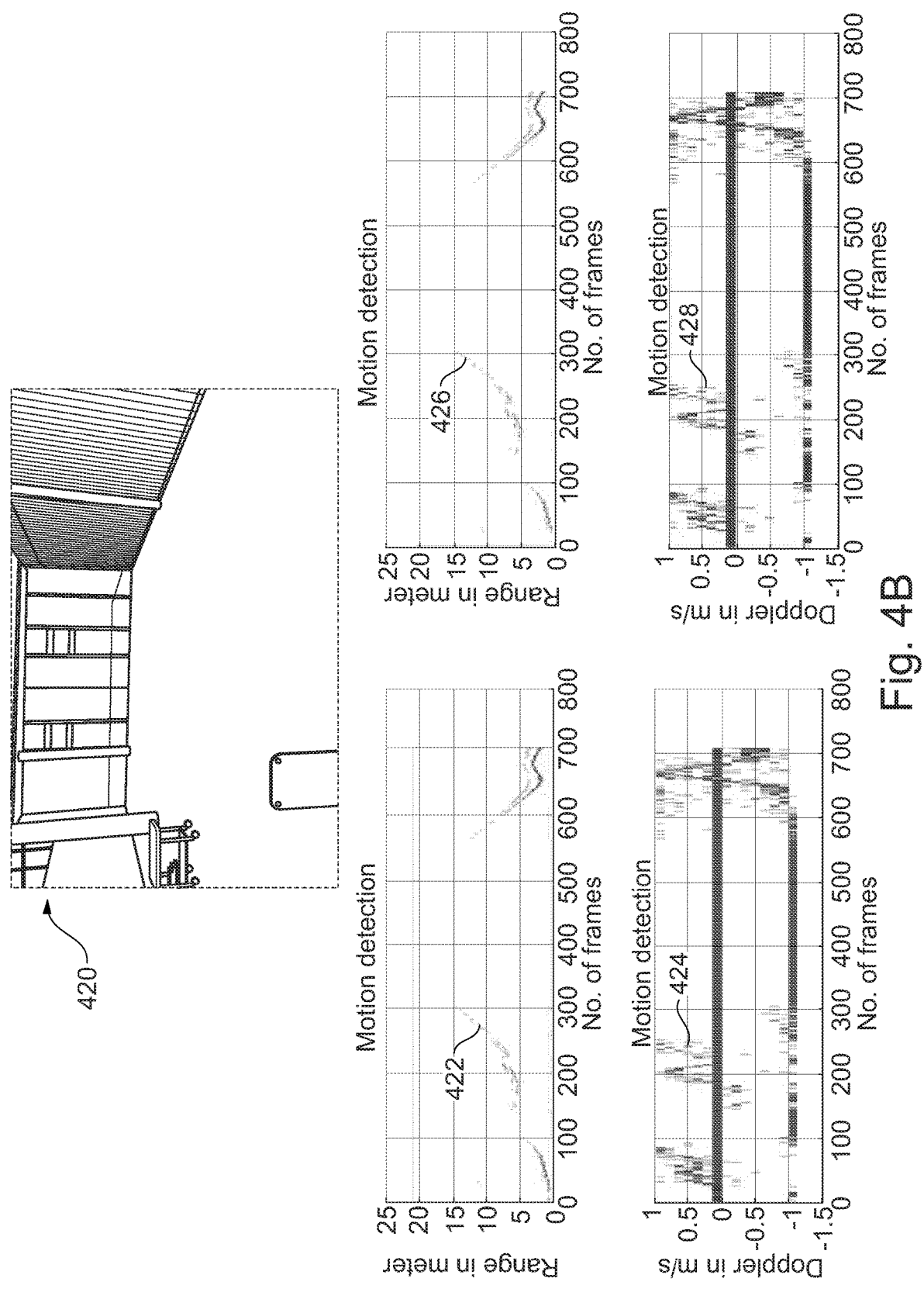

FIG. 4B illustrates a comparison scenario in which a person walks back and forth in a boresight direction in the room depicted in diagram 420. Traces 422 and 424 in the bottom-left portion of FIG. 4B depict experimental results for target detection performed without using embodiment moving averaged CFAR detection techniques, while traces 426 and 428 on the bottom-right portion of FIG. 4B depict experimental results for target detection performed using embodiment moving averaged CFAR detection techniques. More specifically, trace 422 shows the range of the detected target in meters and trace 424 shows the velocity of the detected target in meters per second as detected by the system that does not use embodiment moving averaged CFAR detection techniques. As shown, the detected range varies from 0 meters during the first few frames and about 12 meters around frame 300. The corresponding detected velocity ranges from 1 meter per second as the target moves away from the radar sensor to −1 meter per second as the target moves toward the radar sensor.

Trace 426 shows the range of the detected target in meters and trace 428 shows the velocity of the detected target in meters per second as detected by the system that uses embodiment moving averaged CFAR detection techniques. As shown, traces 426 and 428 show very similar behavior as traces 422 and 424, which demonstrates that embodiment moving average techniques did not negatively impact target detection in this case.

Figure 4C:
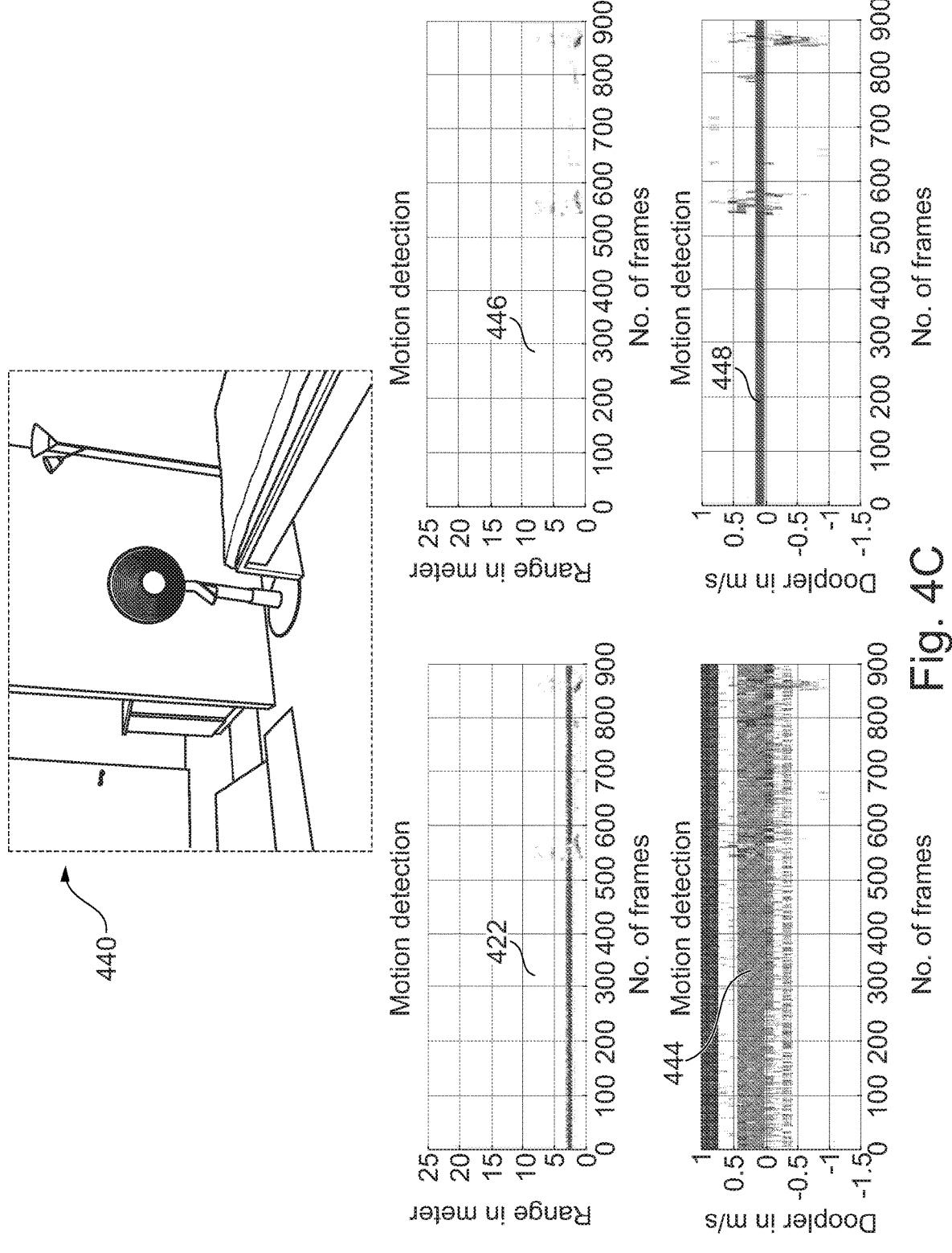

FIG. 4C illustrates a comparison scenario in which a fan operates at a constant speed in the room depicted in diagram 440. Traces 442 and 444 in the bottom-left portion of FIG. 4C depict experimental results for target detection performed without using embodiment moving averaged CFAR detection techniques, while traces 446 and 448 on the bottom-right portion of FIG. 4C depict experimental results for target detection performed using embodiment moving averaged CFAR detection techniques. More specifically, trace 442 shows the range of the detected target in meters and trace 444 shows the velocity of the detected target in meters per second as detected by the system that does not use embodiment moving averaged CFAR detection techniques. As shown, the detected range is about 2.5 meters, which represents the distance from the fan to the radar sensor. The velocity depicted by trace 444 shows an average velocity of about 0.3 meters per second, which represents the velocity of the fan.

Trace 446 shows the range of the detected target in meters and trace 448 shows the velocity of the detected target in meters per second as detected by the system that uses embodiment moving averaged CFAR detection techniques.

As shown, trace 446 representing the range in meters does not show the location of the fan, as the bins representing the fan location have been suppressed using embodiment moving average techniques. Similarly, the velocity depicted by trace 448 shows a zero target velocity because the bins representing the fan velocity are suppressed using embodiment techniques. Thus, as demonstrated, the moving average filter reduces motion detection of a non-target.

Figure 4D:
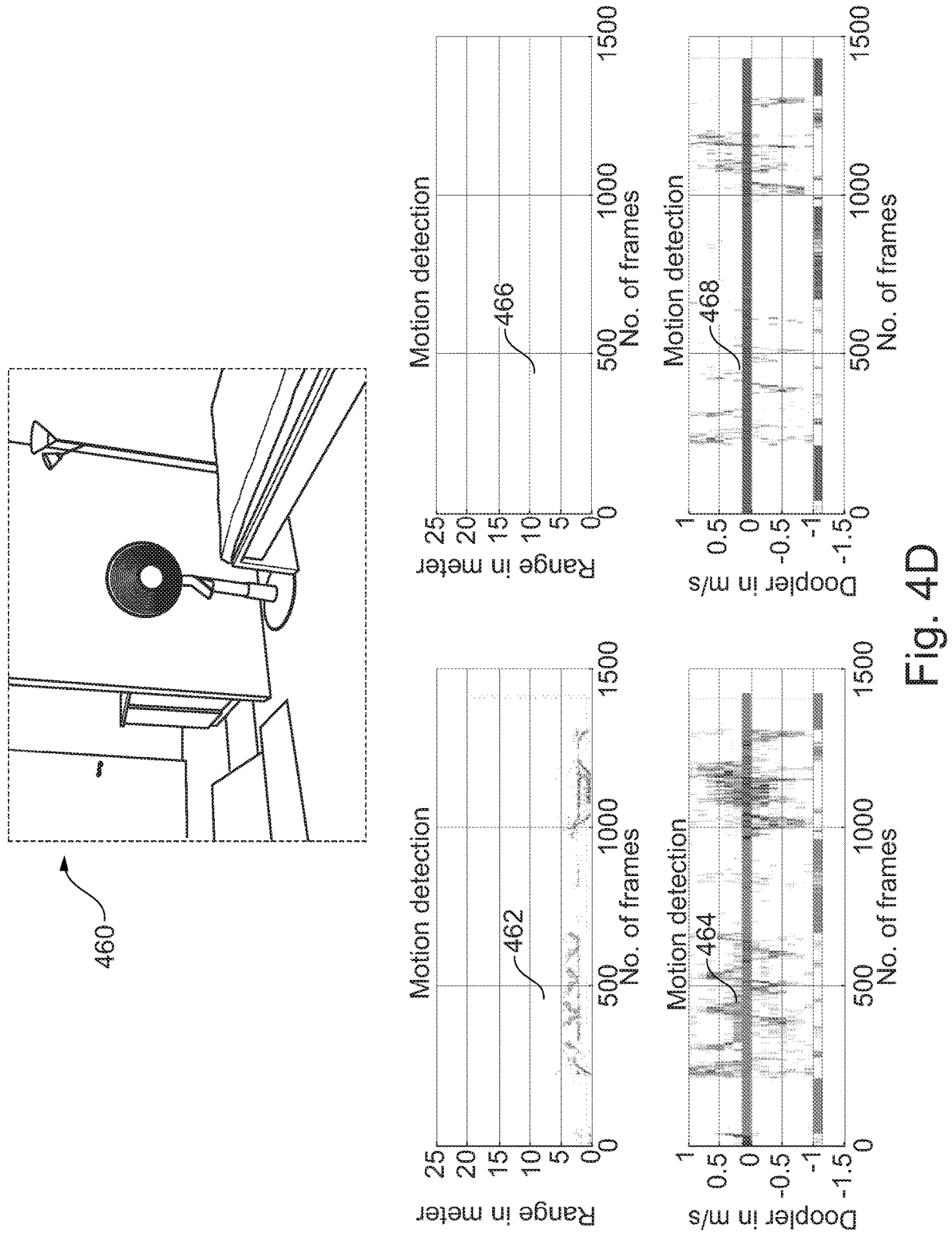

FIG. 4D illustrates a comparison scenario in which a fan operates at a variable speed in the room depicted in diagram 460. Traces 462 and 464 in the bottom-left portion of FIG. 4D depict experimental results for target detection performed without using embodiment moving averaged CFAR detection techniques, while traces 466 and 468 on the bottom-right portion of FIG. 4D depict experimental results for target detection performed using embodiment moving averaged CFAR detection techniques. More specifically, trace 462 shows the range of the detected target in meters and trace 464 shows the velocity of the detected target in meters per second as detected by the system that does not use embodiment moving averaged CFAR detection techniques. As shown, the detected range is about 2.5 meters, which represents the distance from the fan to the radar sensor. The velocity depicted by trace 464 shows a variable velocity, which represents the variable velocity of the fan.

Trace 466 shows the range of the detected target in meters and trace 448 shows the velocity of the detected target in meters per second as detected by the system that uses embodiment moving averaged CFAR detection techniques. As shown, trace 466 representing the range in meters shows less activity than trace 462 representing the range in meters for target detection performed without using embodiment moving averaged CFAR detection techniques.

Similarly, the velocity depicted by trace 468 shows less velocity activity detection than trace 464 representing the velocity for target detection performed without using embodiment moving averaged CFAR detection techniques. Thus, as demonstrated, the moving average filter reduces motion detection of a non-target.

Figure 5:
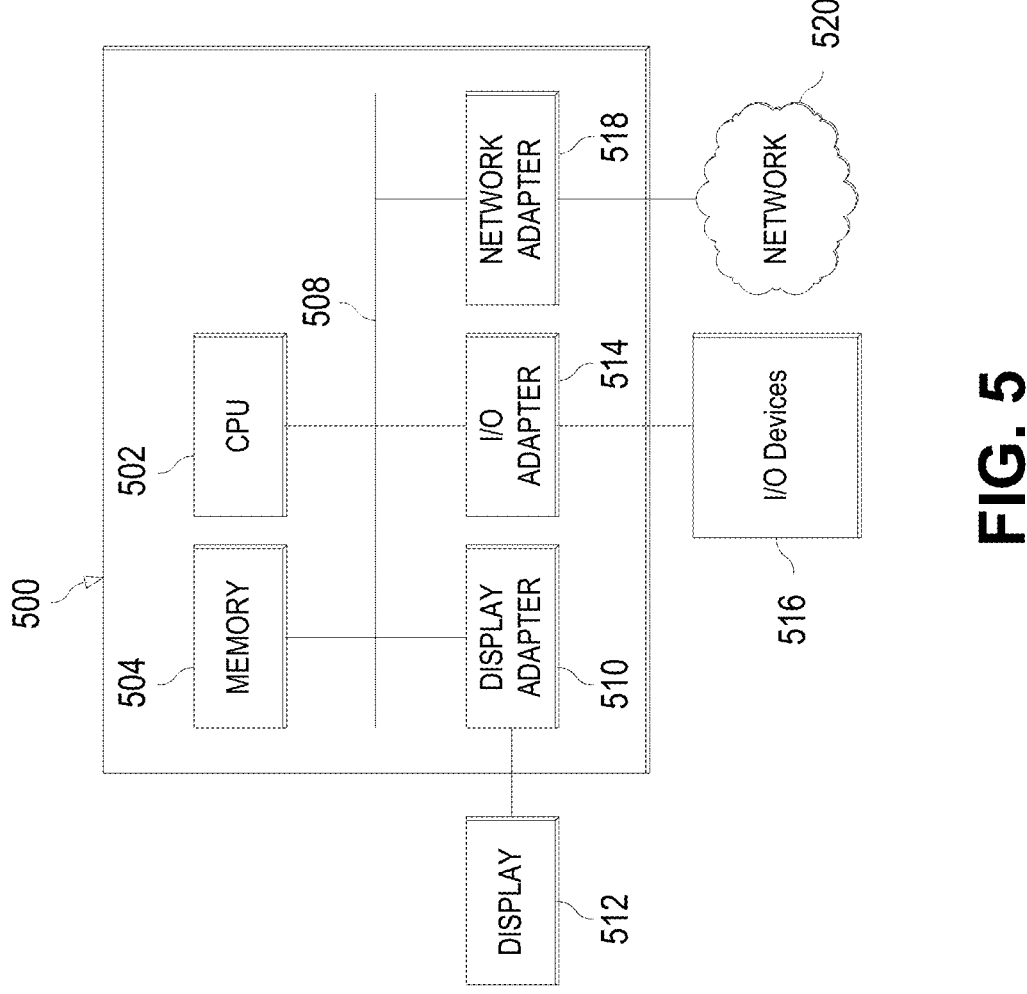
FIG. 5 illustrates a processing system that can be used to implement systems and methods according to embodiments.

Referring now to FIG. 5, a block diagram of a processing system 500 is provided in accordance with an embodiment of the present invention. The processing system 500 depicts a general-purpose platform and the general components and functionality that may be used to implement portions of embodiments described herein such as all or a portion of processing system 104 depicted in FIG. 1 and/or all or a portion of the method steps shown in FIG. 3A and FIG. 3B. In alternative embodiments, these processing tasks may be implemented, for example, using dedicated hardware, such as custom logic, pipelined processing stages, programmable logic, one or more digital signal processors (DSP) or other circuits known in the art suitable for performing digital signal processing tasks.

Processing system 500 may include, for example, a central processing unit (CPU) 502, and memory 504 connected to a bus 508, and may be configured to perform the processes discussed above according to programmed instructions stored in memory 504 or on other non-transitory computer readable media. The processing system 500 may further include, if desired or needed, a display adapter 510 to provide connectivity to a local display 512 and an input-output (I/O) adapter 514 to provide an input/output interface for one or more input/output devices 516, such as a mouse, a keyboard, flash drive or the like.

The processing system 500 may also include a network interface 518, which may be implemented using a network adaptor configured to be coupled to a wired link, such as a network cable, USB interface, or the like, and/or a wireless/cellular link for communications with a network 520. The network interface 518 may also comprise a suitable receiver and transmitter for wireless communications. It should be noted that the processing system 500 may include other components. For example, the processing system 500 may include hardware components power supplies, cables, a motherboard, removable storage media, cases, and the like if implemented externally. These other components, although not shown, are considered part of the processing system 500. In some embodiments, processing system 500 may be implemented on a single monolithic semiconductor integrated circuit and/or on the same monolithic semiconductor integrated circuit as other disclosed system components.

Embodiments of the present invention are summarized here. Other embodiments can also be understood from the entirety of the specification and the claims filed herein.

Example 1. A method including: for each frame of a plurality of frames over time, obtaining a combined image by combining a plurality of range-Doppler images each corresponding to a respective receive antenna of a millimeter-wave radar system; for each range and Doppler bin in the combined images for the frames over time, accumulating values each associated to a given frame and indicative of whether or not a detection has occurred in the corresponding range and Doppler bin in the combined image of the given frame; for each range and Doppler bin in the combined images, determining a moving average based on the values accumulated over time for a corresponding range and Doppler bin; for a current frame, identifying range and Doppler bins in which repeated detection has occurred over past frames based on the moving averages, and generating an updated combined image for the current frame by suppressing the identified range and Doppler bins; and detecting motion in the updated combined image.

Example 2. The method of example 1 further including: obtaining the plurality of range-Doppler images using a constant false alarm rate algorithm.

Example 3. The method of example 2 further including: receiving a digitized radar signal from an analog-to-digital converter, the analog-to-digital converter coupled to the receiving antennas, calculating range fast Fourier transform (FFT) data by performing a range fast Fourier transform on the digitized radar signal for a chirp; and calculating range-Doppler images by performing a Doppler FFT on the range fast Fourier transform data along multiple chirps.

Example 4. The method of example 3, further including obtaining moving target indicator data by applying moving target indicator filtering raw digital data from the analog-to-digital converter before performing the range FFT on the digitized radar signal, where the target indicator filtering removed static targets from the digitized radar signal.

Example 5. The method of one of examples 1 to 4, where suppressing the identified range and Doppler bins includes setting values of the identified range and Doppler bins to zero.

Example 6. A method including: determining whether motion is detected on a per-bin basis for a sequence of range-Doppler images generated by a millimeter-wave radar sensor; summing a number of determined motion detections on a per-bin basis for a first number of range-Doppler images of the sequence of range-Doppler images to produce summed motion detections; determining per-bin moving averages for the summed motion detections; comparing each per-bin moving average of the per-bin moving averages to a threshold; suppressing bins in a range-Doppler image of the sequence of range-Doppler images to produce a modified range-Doppler image, the suppressed bins corresponding to bins in the range-Doppler image whose moving average exceeds the threshold; and detecting motion based on the modified range-Doppler image.

Example 7. The method of example 6, where determining whether motion is detected includes applying a constant false alarm rate algorithm to the sequence of range-Doppler images.

Example 8. The method of one of examples 6 or 7, where suppressing the bins in the range-Doppler image includes setting values of the suppressed bins in the modified range-Doppler image to zero.

Example 9. The method of one of examples 6 to 8, where each range-Doppler image of the sequence of range-Doppler images includes a combined range-Doppler image based on data received from a plurality of antennas.

Example 10. The method of one of examples 6 to 9, further including generating the sequence of range-Doppler images based on a radar signal received by a millimeter-wave radar system.

Example 11. The method of one of examples 6 to 10, further including: receiving a digitized radar signal from the millimeter-wave radar sensor; performing a range fast Fourier transform (FFT) on the digitized radar signal to produce range FFT data; and performing a Doppler FFT on the range FFT data to produce the range-Doppler image of the sequence of range-Doppler images.

Example 12. The method of example 11, further including applying moving target indicator filtering to the received digitized radar signal before performing the range FFT.

Example 13. The method of one of examples 11 or 12, further including digitizing a radar signal produced by the millimeter-wave radar sensor using an analog-to-digital converter to produce the digitized radar signal.

Example 14. A system including: a radar signal processor configured to be coupled to a millimeter-wave radar sensor, the radar signal processor configured to: receive a radar signal from a radar sensor; generate a sequence of range-Doppler images based on the received radar signal; determine whether motion is detected on a per-bin basis for the sequence of range-Doppler images; sum a number of determined motion detections on a per-bin basis for a first number of range-Doppler images of the sequence of range-Doppler images to produce summed motion detections; determine per-bin moving averages for the summed motion detections; compare each per-bin moving average of the per-bin moving averages to a threshold; suppress bins in a range-Doppler image of the sequence of range-Doppler images to produce a modified range-Doppler image, the suppressed bins corresponding to bins in the range-Doppler image whose moving average exceeds the threshold; and detect motion based on the modified range-Doppler image.

Example 15. The system of example 14, where the radar signal processor is configured to determine whether motion is detected by applying a constant false alarm rate algorithm to the sequence of range-Doppler images.

Example 16. The system of one of examples 14 or 15, where the radar signal processor is configured to suppress the bins in the range-Doppler image by setting values of the suppressed bins in the modified range-Doppler image to zero.

Example 17. The system of one of examples 14 to 16, where each range-Doppler image of the sequence of range-Doppler images includes a combined range-Doppler image based on data received from a plurality of antennas of the radar sensor.

Example 18. The system of one of examples 14 to 17, further including the radar sensor.

Example 19. The system of one of examples 14 to 18, where the radar sensor includes a millimeter-wave radar sensor.

Example 20. The system of one of examples 14 to 19, where: the radar signal processor is further configured to: perform a range fast Fourier transform (FFT) on the radar signal to produce range FFT data; and perform a Doppler FFT on the range FFT data to produce the range-Doppler image of the sequence of range-Doppler images.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method comprising:
for each frame of a plurality of frames over time, obtaining a combined image by combining a plurality of range-Doppler images each corresponding to a respective receive antenna of a millimeter-wave radar system, wherein the range-Doppler images are representative of a scene;
for each range and Doppler bin in the combined images for the frames over time, accumulating values each associated to a given frame and indicative of whether or not a detection has occurred in the corresponding range and Doppler bin in the combined image of the given frame;
for each range and Doppler bin in the combined images, determining a moving average based on the values accumulated over multiple frames of the plurality of frames for a corresponding range and Doppler bin;
filtering periodically moving objects in the scene in real time, filtering comprising, for a current frame, identifying range and Doppler bins in which repeated detection has occurred over past frames based on the moving averages, and generating an updated combined image for the current frame by suppressing the identified range and Doppler bins; and
detecting motion in the updated combined image, wherein the motion is detected using motion data from range and Doppler bins in the updated combined image that have moving averages below a detection threshold.

2. The method of claim 1 further comprising:
obtaining the plurality of range-Doppler images using a constant false alarm rate algorithm.

3. The method of claim 2 further comprising:
receiving a digitized radar signal from an analog-to-digital converter, the analog-to-digital converter coupled to the receiving antennas,
calculating range fast Fourier transform (FFT) data by performing a range fast Fourier transform on the digitized radar signal for a chirp; and
calculating the range-Doppler images by performing a Doppler FFT on the range fast Fourier transform data along multiple chirps.

4. The method of claim 3, further comprising obtaining moving target indicator data by applying moving target indicator filtering to raw digital data from the analog-to-digital converter before performing the range FFT on the digitized radar signal, wherein the moving target indicator filtering removes static targets from the digitized radar signal.

5. The method of claim 1, wherein suppressing the identified range and Doppler bins comprises setting values of the identified range and Doppler bins to zero.

6. The method of claim 1, wherein suppressing each identified range and Doppler bin comprises zeroing values of the combined image for each identified range and Doppler bin.

7. The method of claim 1, wherein identifying the range and Doppler bins in which repeated detection has occurred over past frames based on the moving averages comprises comparing the moving average for each corresponding range and Doppler bin to a threshold, wherein the suppressed range and Doppler bins correspond to bins whose moving average exceeds the threshold.

8. A method comprising:
determining whether motion is detected on a per-bin basis for a sequence of range-Doppler images generated by a millimeter-wave radar sensor, wherein the range-Doppler images are representative of a scene;
summing a number of determined motion detections on a per-bin basis for a first number of range-Doppler images of the sequence of range-Doppler images to produce summed motion detections;
filtering periodically moving objects in the scene in real time comprising:
determining per-bin moving averages for the summed motion detections,
comparing each per-bin moving average of the per-bin moving averages to a threshold, and
suppressing bins in a range-Doppler image of the sequence of range-Doppler images to produce a modified range-Doppler image, the suppressed bins corresponding to bins in the range-Doppler image whose moving average exceeds the threshold; and
detecting motion based on the modified range-Doppler image, wherein the motion is detected using motion data from range and Doppler bins in the modified range-Doppler image that have moving averages below the threshold.

9. The method of claim 8, wherein determining whether motion is detected comprises applying a constant false alarm rate algorithm to the sequence of range-Doppler images.

10. The method of claim 8, wherein suppressing the bins in the range-Doppler image comprises setting values of the suppressed bins in the modified range-Doppler image to zero.

11. The method of claim 10, wherein each range-Doppler image of the sequence of range-Doppler images comprises a combined range-Doppler image based on data received from a plurality of antennas.

12. The method of claim 8, further comprising:
receiving a digitized radar signal from the millimeter-wave radar sensor;
performing a range fast Fourier transform (FFT) on the digitized radar signal to produce range FFT data; and
performing a Doppler FFT on the range FFT data to produce the range-Doppler image of the sequence of range-Doppler images.

13. The method of claim 12, further comprising applying moving target indicator filtering to the received digitized radar signal before performing the range FFT.

14. The method of claim 12, further comprising digitizing a radar signal produced by the millimeter-wave radar sensor using an analog-to-digital converter to produce the digitized radar signal.

15. A system comprising:

a radar signal processor configured to be coupled to a millimeter-wave radar sensor, the radar signal processor configured to:

receive a radar signal from the millimeter-wave radar sensor, generate a sequence of range-Doppler images based on the received radar signal, wherein the range-Doppler images are representative of a scene;

determine whether motion is detected on a per-bin basis for the sequence of range-Doppler images, sum a number of determined motion detections on a per-bin basis for a first number of range-Doppler images of the sequence of range-Doppler images to produce summed motion detections, filter periodically moving objects in the scene in real time by:

determining per-bin moving averages for the summed motion detections, comparing each per-bin moving average of the per-bin moving averages to a threshold, and suppressing bins in a range-Doppler image of the sequence of range-Doppler images to produce a modified range-Doppler image, the suppressed bins corresponding to bins in the range-Doppler image whose moving average exceeds the threshold; and detect motion based on the modified range-Doppler image, wherein the motion is detected using motion data from range and Doppler bins in the modified range-Doppler image that have moving averages below the threshold.

16. The system of claim 15, wherein the radar signal processor is configured to determine whether motion is detected by applying a constant false alarm rate algorithm to the sequence of range-Doppler images.

17. The system of claim 16, wherein the radar signal processor is configured to suppress the bins in the range-Doppler image by setting values of the suppressed bins in the modified range-Doppler image to zero.

18. The system of claim 17, wherein each range-Doppler image of the sequence of range-Doppler images comprises a combined range-Doppler image based on data received from a plurality of antennas of the millimeter-wave radar sensor.

19. The system of claim 15, further comprising the millimeter-wave radar sensor.

20. The system of claim 14, wherein:

the radar signal processor is further configured to:

perform a range fast Fourier transform (FFT) on the radar signal to produce range FFT data; and perform a Doppler FFT on the range FFT data to produce the range-Doppler image of the sequence of range-Doppler images.

* * * * *